(12) United States Patent
Ramb

(10) Patent No.: US 8,992,166 B2
(45) Date of Patent: Mar. 31, 2015

(54) TURBOCHARGER

(75) Inventor: Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 493 days.

(21) Appl. No.: 13/510,028

(22) PCT Filed: Nov. 16, 2010

(86) PCT No.: PCT/US2010/056772
§ 371 (c)(1),
(2), (4) Date: May 16, 2012

(87) PCT Pub. No.: WO2011/066129
PCT Pub. Date: Jun. 3, 2011

(65) Prior Publication Data
US 2012/0251299 A1    Oct. 4, 2012

(30) Foreign Application Priority Data
Nov. 27, 2009   (DE) .......................... 10 2009 056 047

(51) Int. Cl.
*F01D 17/12* (2006.01)
*F01D 17/16* (2006.01)
*F02B 37/24* (2006.01)

(52) U.S. Cl.
CPC .............. *F01D 17/165* (2013.01); *F02B 37/24* (2013.01); *Y02T 10/144* (2013.01); *F05D 2220/40* (2013.01)
USPC ........... 415/159; 415/160; 415/163; 415/164; 415/165

(58) Field of Classification Search
USPC .......................... 415/159, 160, 163, 164, 165
See application file for complete search history.

(56) References Cited

U.S. PATENT DOCUMENTS

| 4,741,666 | A  | * | 5/1988  | Shimizu et al.    | 415/158 |
|-----------|----|---|---------|-------------------|---------|
| 6,659,718 | B2 | * | 12/2003 | Jinnai et al.     | 415/164 |
| 6,736,595 | B2 | * | 5/2004  | Jinnai et al.     | 415/164 |
| 6,907,733 | B2 | * | 6/2005  | Nishiyama et al.  | 415/150 |
| 7,886,536 | B2 | * | 2/2011  | Hemer             | 415/159 |
| 8,328,520 | B2 | * | 12/2012 | Boening et al.    | 416/160 |
| 8,545,173 | B2 | * | 10/2013 | Valin et al.      | 415/164 |

* cited by examiner

*Primary Examiner* — Igor Kershteyn
(74) *Attorney, Agent, or Firm* — A. Michael Tucker; Stephen A. Pendorf; Patent Central LLC

(57) ABSTRACT

The invention relates to a turbocharger (1) with variable turbine geometry (VTG), having a turbine housing (2) with a supply duct (9) for exhaust gases, having a turbine rotor (4) which is rotatably mounted in the turbine housing (2); and having a guide grate (18), which surrounds the turbine rotor (4) radially at the outside, which has a blade bearing ring (6), which has a multiplicity of guide blades (7) which have in each case one blade shaft mounted in the blade bearing ring (6), which has an adjusting ring (5) which is operatively connected to the guide blades (7) by means of associated blade levers (20) fastened to the blade shafts (8) at one of their ends, with each blade lever (20) having, at the other end, a lever head (23) which can be placed in engagement with an associated engagement recess (24) of the adjusting ring (5), and which has a stop (25) at least for setting the minimum throughflow through the nozzle cross sections formed by the guide blades (7), wherein the stop (25) is formed as a partially hollow adjusting pin.

19 Claims, 3 Drawing Sheets

TURBOCHARGER

Figure 1:
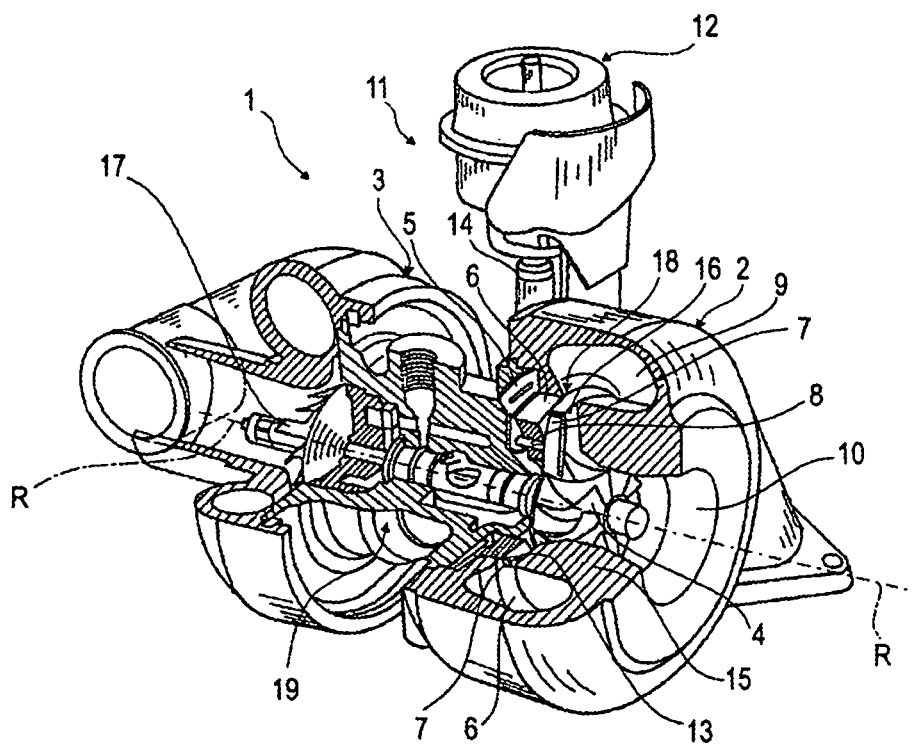

A turbocharger of said type is known from EP 1 564 380 A1. To prevent weakening of the adjusting ring, said document proposes a stop which is integrally connected to the adjusting ring and which is composed of a web, the width of which may be varied or provided with an adjustable worm screw. Said design duly yields in a certain way the possibility of an adjustable stop, but a stop constructed in this way would in practice be almost impracticable because firstly the spatial conditions would require the insertion of a worm screw, which moreover would require the provision of an internal thread in the single-piece stop part and moreover, it would be necessary to provide a locking facility for the worm screw in order to be able to fix the setting carried out. On account of the extremely restricted spatial conditions in reality, this is associated with a high level of expenditure, and is therefore not desirable.

However, in the known turbocharger, as a result of the integral formation of the stop on the adjusting ring, it is possible only with relatively high expenditure, if at all, to rework the projection of the stop after the assembly of the guide grate, for example if a correction of the end positions of the guide grate must be carried out. It is therefore an object of the present invention to provide a turbocharger which permits a simplification of the assembly of the a guide grate or guide apparatus, wherein at least a simple and precise setting of the minimum throughflow should be possible by means of the guide apparatus alone.

Since the stop by means of which at least a setting of the minimum throughflow through the nozzle cross sections formed by the guide blades is possible is designed as a deformable component which can be fixed in the guide grate, it is possible after the assembly of the guide grate for said stop to be reworked in a simple manner in order to precisely set the required stop position, since said stop is not integrally connected to the guide grate. If it is necessary to re-adjust one of the two end positions of the guide grate, it is therefore possible in a simple manner either for a stop part which is pre-deformed for the desired end position (narrow-round-wide) to be selected and mounted, or the already-mounted stop part may be provided with the desired dimension by means of a plastic deformation process.

In other words, this means that the adjusting pin, after production, that is to say in its production state, initially has an at least approximately round, ideally exactly round cross section which, on account of its partially hollow design, can be deformed in two directions, with said two deformation directions running through the central point of the adjusting pin and being perpendicular to one another. A deformation of the round cross section of the adjusting pin to form an oval is therefore possible, in order thereby to make the desired assembly dimension narrower. For this purpose, use may be made of a pressing tool which, by means of a rotation through 90°, can also press the adjusting pin such that the latter is made wider, with a deformation to form an oval again being achieved. The abovementioned correction of an adjusting pin which has already been compressed to too great an extent is also possible.

This results in the advantage that firstly the adjusting pin which forms a stop can be considerably simplified in terms of its construction in relation to the prior art, which results in a reduction in costs for production and assembly.

There is also the resulting advantage of a reduced amount of machining in the blade bearing ring, and as already mentioned, compression of the adjusting pin is possible in two directions.

Finally, the graduations of the adjusting pins can be expanded, which yields the advantage of a reduction in components.

In a preferred embodiment, the partially hollow geometry of the adjusting pin results in particularly low deformation forces.

In principle, it is possible for the stop to be fixed either to the blade bearing ring, which is stationary in the housing, or to the movable adjusting ring. The projection of the stop then accordingly interacts either with counterpart stop surfaces of the adjusting ring or with the fastening rings of the blade levers.

There is also the resulting advantage that the entire guide apparatus may be pre-assembled completely as a cartridge, and the minimum throughflow may be set before said cartridge is then inserted into the turbine housing.

The setting of the minimum throughflow therefore takes place independently of the turbine housing and other components of the turbocharger, such as for example the bearing housing. Also, the connecting piece position between the bearing and turbine housings no longer has an influence on the minimum throughflow setting. Likewise, wear of adjusting lever and of its engagement on the adjusting ring does not have an effect on the minimum throughflow quantity.

Figure 2:
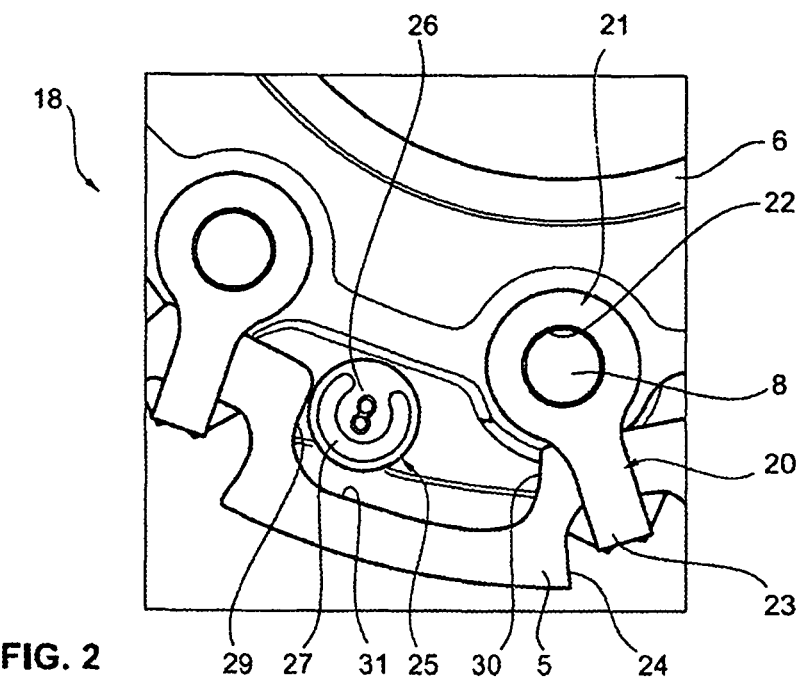
Figures 3, 4:
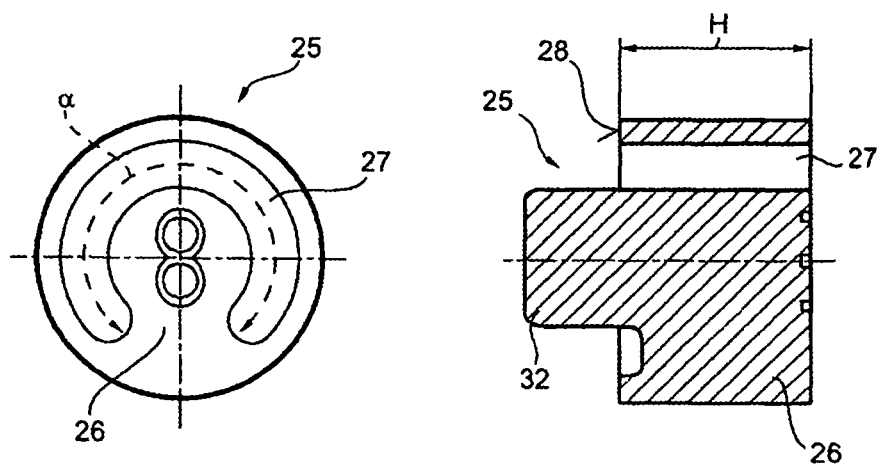
Figure 5:
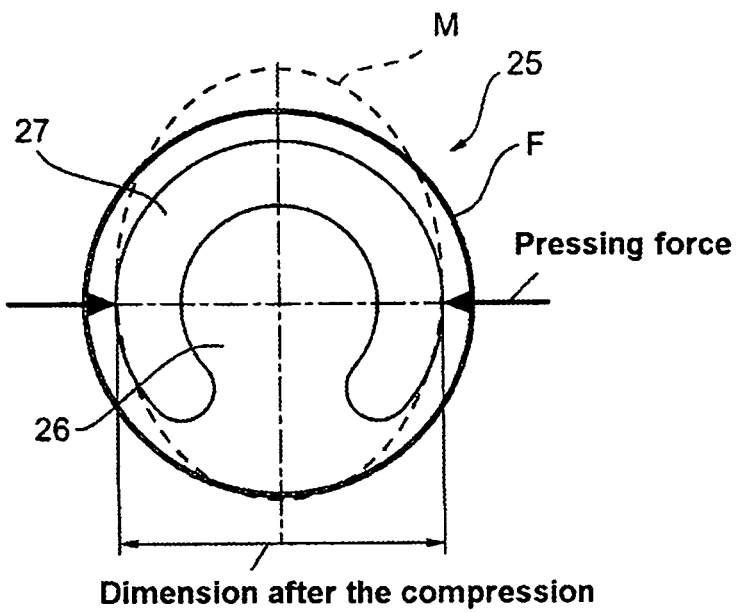
Figure 6:
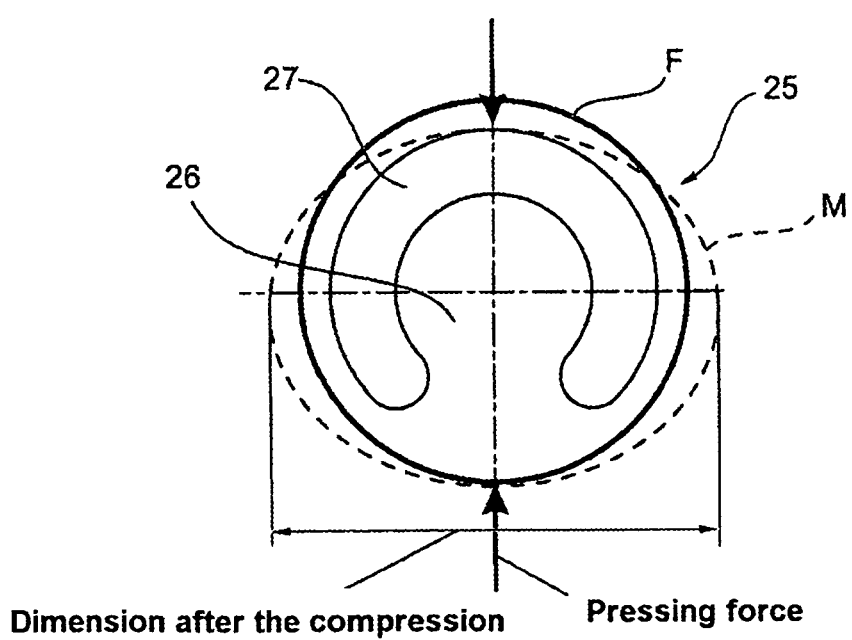

Further details, advantages and features of the invention will emerge from the following description of an exemplary embodiment on the basis of a drawing, in which:

FIG. 1 shows a sectional perspective illustration of the basic design of a turbocharger according to the invention, FIG. 2 shows a partial view of the guide grate according to the invention, FIG. 3 shows a plan view of an adjusting pin according to the invention, FIG. 4 shows a sectional illustration of the adjusting pin according to FIG. 3, and FIGS. 5 and 6 show plan views of the adjusting pin according to the invention for explaining its deformation possibilities from its production state F into different assembly states M.

FIG. 1 illustrates a turbocharger 1 according to the invention which has a turbine housing 2 and a compressor housing 3 which is connected thereto via a bearing housing 19. The housings 2, 3 and 19 are arranged along a rotational axis R. The turbine housing 2 is shown partially in section in order to illustrate the arrangement of a blade bearing ring 6 as part of a radially outer guide grate 18 which has a multiplicity of guide blades 7 which are distributed over the circumference and which have pivot axles or blade shafts 8. In this way, nozzle cross sections are formed which are larger or smaller depending on the position of the guide blades 7 and which act on the turbine rotor 4, which is mounted in the center on the axis of rotation R, to a greater or lesser extent with exhaust gas of an engine, which exhaust gas is supplied via a supply duct 9 and discharged via a central connecting piece 10, in order via the turbine rotor 4 to drive a compressor rotor 17 seated on the same shaft.

To control the movement or the position of the guide blades 7, an actuating device 11 is provided. Said actuating device 11 may be of any desired design, but in a preferred embodiment has a control housing 12 which controls the control movement of a plunger element 14 fastened thereto, in order to convert the movement of said plunger element 14 into a slight rotational movement of an adjusting ring 5 situated behind the blade bearing ring 6. Formed between the blade bearing ring 6 and an annular part 15 of the turbine housing 2 is a free space 13 for the guide blades 7. To be able to ensure said free space 13, the blade bearing ring 6 has integrally formed spacers 16.

In the example, three spacers 16 are arranged on the circumference of the blade bearing ring 6 at angular intervals of in each case 120°. In principle, however, it is possible to provide more or fewer spacers 16 of said type.

FIG. 2 shows a partial view of an embodiment of the guide grate 18 according to the invention on an enlarged scale.

Illustrated representatively for all of the guide blades of said guide grate 18 is a blade lever 20 which, at one end, has a fastening ring 21 with a recess 22 in which one end of the blade shaft 8 is fixed.

A lever head 23 of the blade lever 20 is arranged in an engagement recess 24 of the adjusting ring and is therefore in engagement with the adjusting ring 5.

Furthermore, FIG. 2 illustrates the arrangement of a stop 25 in the form of a deformable adjusting pin.

As shown in detail in FIG. 3, the stop 25 has an adjusting section 26 with an at least approximately round cross section in the production state, in which adjusting section 26 is formed a recess 27 which runs in the circumferential direction. Also illustrated in FIG. 3 is the angle α as a measure for the extent of the recess 27. Here, the recess 27 may extend both over an angle α of at least 180° and also, in the illustrated embodiment, over an angle α of approximately 300°. The maximum angle is determined by the mechanical stability of the stop 25.

As illustrated in FIG. 4, the recess 27 extends over the entire height H of the adjusting section 26.

Furthermore, the adjusting section 26 has a fixing peg 32 which, as can be seen from FIG. 4, is arranged centrally on the adjusting section 26 and extends from an end surface 28. The fastening of the fixing pin 32 in a bore of the blade bearing ring 6 takes place for example with an interference fit, such that no relative movements are possible.

In a preferred embodiment, the stop 25 is formed as a partially hollow stepped pin. The stop 25 maybe produced from sheet metal.

FIG. 5 illustrates the effect of a pressure force which is applied laterally to the cross section of the partially hollow stop 25 by a pressing tool (not illustrated). As a result of the pressure force being applied in the circumferential direction of the guide apparatus 18, the cross section of the stop 25 is provided with an oval shape illustrated by the dashed line M. Said oval shape constitutes the desired degree of deformation in the pressing direction after the pressing process.

Furthermore, FIG. 6 shows the second deformation direction which is rotated by 90° in relation to that from FIG. 5 and which runs in the radial direction of the guide apparatus 18. The pressure force on the stop 25 again results in an oval shape M which is illustrated by dashed lines in the Figure. The dimension after the pressing process as indicated here is likewise determined by the dimension of the oval of the stop 25 in the circumferential direction of the guide apparatus 18.

To supplement the disclosure, reference is made explicitly to the diagrammatic illustration of the invention in FIGS. 1 to 6.

LIST OF REFERENCE NUMERALS

1 Turbocharger
2 Turbine housing
3 Compressor housing
4 Turbine rotor
5 Adjusting ring
6 Blade bearing ring
7 Guide blades
8 Blade shaft
9 Supply duct
10 Axial connecting piece
11 Actuating device
12 Control housing
13 Free space for guide blades 7
14 Plunger element
15 Annular part of the turbine housing 2
16 Spacer/spacer cam
17 Compressor rotor
18 Guide grate/guide apparatus
19 Bearing housing
20 Blade lever
21 Fastening ring
22 Recess
23 Lever head
24 Engagement recesses
25 Stop
26 Adjusting section
27 Recess
28 End surface
29, 30 Stop cams
31 Groove
32 Fixing peg

The invention claimed is:

1. A turbocharger (1) with variable turbine geometry (VTG)
   having a turbine housing (2) with a supply duct (9) for exhaust gases,
   having a turbine rotor (4) which is rotatably mounted in the turbine housing (2); and
   having a guide grate (18),
     which surrounds the turbine rotor (4) radially at the outside,
     which has a blade bearing ring (6),
     which has a multiplicity of guide blades (7) which have in each case one blade shaft (8) mounted in the blade bearing ring (6),
     which has an adjusting ring (5) which is operatively connected to the guide blades (7) by means of associated blade levers (20) fastened to the blade shafts (8) at one of their ends, with each blade lever (20) having, at the other end, a lever head (23) which can be placed in engagement with an associated engagement recess (24) of the adjusting ring (5), and
     which has a stop (25) at least for setting the minimum throughflow through the nozzle cross sections formed by the guide blades (7), wherein
     the stop (25) is formed as a partially hollow adjusting pin.

2. The turbocharger as claimed in claim 1, wherein the adjusting pin (25) has an adjusting section (26) which is at least approximately round in the production state (F) and in which is arranged a recess (27) which runs in the circumferential direction.

3. The turbocharger as claimed in claim 2, wherein the recess (27) extends through the entire height (H) of the adjusting section (26).

4. The turbocharger as claimed in claim 2, wherein the recess (27) extends over an angle (α) of at least 180°.

5. The turbocharger as claimed in claim 4, wherein the recess (27) extends over an angle (α) of approximately 300°.

6. The turbocharger as claimed in claim 2, wherein the adjusting section (26) has a fixing peg (32).

7. The turbocharger as claimed in claim 6, wherein the fixing peg (32) has a fixed connection to the guide grate (18).

8. The turbocharger as claimed in claim 7, wherein the fixing peg (32) is arranged centrally on the adjusting section (26) and extends from an end surface (28) of the adjusting section (26).

9. The turbocharger as claimed in claim 1, wherein the adjusting pin (25) is produced from sheet metal.

10. A guide grate (18) for a turbocharger (1) with variable turbine geometry (VTG), which guide grate (18) surrounds a turbine rotor (4) of the turbocharger (1) radially at the outside and has the following parts:
- a blade bearing ring (6),
- a multiplicity of guide blades (7) which have in each case one blade shaft (8) mounted in the blade bearing ring (6),
- an adjusting ring (5) which is operatively connected to the guide blades (7) by means of associated blade levers (20) fastened to the blade shafts (8) at one of their ends, with each blade lever (20) having, at the other end, a lever head (23) which can be placed in engagement with an associated engagement recess (24) of the adjusting ring (5), and
- a stop (25) at least for setting the minimum throughflow through the nozzle cross sections formed by the guide blades (7), wherein
- the stop (25) is formed as an at least partially hollow adjusting pin.

11. The guide grate as claimed in claim 10, wherein the adjusting pin (25) has an adjusting section (26) which is at least approximately round in the production state (F) and in which is arranged a recess (27) which runs in the circumferential direction.

12. The guide grate as claimed in claim 11, the adjusting section (26) has a fixing peg (32).

13. The guide grate as claimed in claim 12, wherein the fixing peg (32) has a fixed connection to the guide grate (18).

14. The guide grate as claimed in claim 13, wherein the fixing peg (32) is arranged centrally on the adjusting section (26) and extends from an end surface (28) of the adjusting section (26).

15. The guide grate as claimed in claim 10, wherein the recess (27) extends through the entire height (H) of the adjusting section (26).

16. The guide grate as claimed in claim 10, wherein the recess (27) extends over an angle ($\alpha$) of at least 180°.

17. The guide grate as claimed in claim 16, wherein the recess (27) extends over an angle ($\alpha$) of approximately 300°.

18. The guide grate as claimed in claim 10, wherein the adjusting pin (25) is produced from sheet metal.

19. A stop of a guide grate (18) for a turbocharger (1) with variable turbine geometry (VTG), which guide grate (18) surrounds a turbine rotor (4) of the turbocharger (1) radially at the outside and has the following parts:
- a blade bearing ring (6),
- a multiplicity of guide blades (7) which have in each case one blade shaft (8) mounted in the blade bearing ring (6),
- an adjusting ring (5) which is operatively connected to the guide blades (7) by means of associated blade levers (20) fastened to the blade shafts (8) at one of their ends, with each blade lever (20) having, at the other end, a lever head (23) which can be placed in engagement with an associated engagement recess (24) of the adjusting ring (5), wherein the stop (25) is formed as an at least partially hollow adjusting pin.

* * * * *